United States Patent
Elyada et al.

(10) Patent No.: US 9,785,201 B2
(45) Date of Patent: Oct. 10, 2017

(54) CONTROLLING IMAGES AT MOBILE DEVICES USING SENSORS

(75) Inventors: Oded Elyada, Kfar Saba (IL); Guy Asi Merin, Einhod (IL); Karen Rachel Master Ben-Dor, Kafar Sava (IL); Adi Diamant, Shoham (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 752 days.

(21) Appl. No.: 13/409,443

(22) Filed: Mar. 1, 2012

(65) Prior Publication Data

US 2013/0229406 A1    Sep. 5, 2013

(51) Int. Cl.
| | |
|---|---|
| *G06Q 30/02* | (2012.01) |
| *G09G 5/14* | (2006.01) |
| *G06F 1/16* | (2006.01) |
| *G06F 3/0487* | (2013.01) |

(52) U.S. Cl.
CPC .......... *G06F 1/1694* (2013.01); *G06F 3/0487* (2013.01); *G06Q 30/02* (2013.01); *G09G 5/14* (2013.01); *G09G 2340/12* (2013.01); *G09G 2340/145* (2013.01); *G09G 2370/027* (2013.01)

(58) Field of Classification Search
CPC ................................................. G06C 30/0242
See application file for complete search history.

(56) References Cited

U.S. PATENT DOCUMENTS

| | | | | |
|---|---|---|---|---|
| 5,805,782 A | * | 9/1998 | Foran .............................. | 345/426 |
| 7,280,096 B2 | * | 10/2007 | Marvit .................. | G06F 1/1613 345/156 |
| 8,291,016 B1 | * | 10/2012 | Whitney ............ | G06Q 30/0201 709/204 |
| 8,605,133 B2 | * | 12/2013 | Lampotang ............. | G06F 3/011 348/36 |
| 2004/0137954 A1 | * | 7/2004 | Engstrom et al. ............. | 455/566 |
| 2005/0052427 A1 | * | 3/2005 | Wu et al. ....................... | 345/173 |
| 2006/0017692 A1 | * | 1/2006 | Wehrenberg et al. ........ | 345/156 |
| 2008/0021666 A1 | * | 1/2008 | Goode et al. ................... | 702/85 |

(Continued)

OTHER PUBLICATIONS

This End Up: Using Device Orientation, LePage, Apr. 29, 2011, pp. 1-11.*

(Continued)

*Primary Examiner* — Jacinta M Crawford
*Assistant Examiner* — Phong Nguyen

(57) ABSTRACT

Controlling images at mobile devices using sensors is described, for example, for interactive advertisements which respond to sensor readings at a mobile computing device. In various embodiments images are displayed at a mobile computing device according to sensor readings observed at the device and before user input is received at the images. For example, different regions of an image depicting a panorama are displayed as a mobile device is panned around or tilted. In another example images of an object in different orientations are presented as a mobile device is tilted in order to display the object as rotating. In various examples the images are displayed as part of a web page by using a template in the web page to control the display of images according to sensor readings. In various examples sensor readings are used to report user engagement with advertisements.

20 Claims, 8 Drawing Sheets

(56) References Cited

U.S. PATENT DOCUMENTS

| | | | | |
|---|---|---|---|---|
| 2008/0140529 A1* | 6/2008 | Agarwal | ................ | G06Q 30/02 705/14.54 |
| 2008/0214902 A1* | 9/2008 | Lee | ................ | A61B 5/16 600/301 |
| 2008/0215428 A1 | 9/2008 | Ramer et al. | | |
| 2008/0221400 A1* | 9/2008 | Lee | ................ | A61B 5/024 600/301 |
| 2008/0284738 A1* | 11/2008 | Hovden | ................ | G06F 1/1626 345/173 |
| 2009/0012866 A1* | 1/2009 | Celik | ................ | G06F 17/30386 705/14.48 |
| 2009/0012867 A1* | 1/2009 | Lerman et al. | ................ | 705/14 |
| 2009/0217315 A1* | 8/2009 | Malik | ................ | G06K 9/00362 725/9 |
| 2009/0219166 A1 | 9/2009 | MacFarlane et al. | | |
| 2009/0278828 A1* | 11/2009 | Fletcher et al. | ................ | 345/207 |
| 2010/0060664 A1* | 3/2010 | Kilpatrick, II | ................ | G06F 1/1616 345/650 |
| 2010/0100359 A1* | 4/2010 | Podoloff | ................ | G06F 3/01 702/191 |
| 2010/0123737 A1* | 5/2010 | Williamson et al. | ................ | 345/672 |
| 2010/0138285 A1 | 6/2010 | Leonard et al. | | |
| 2010/0141571 A1 | 6/2010 | Chiang et al. | | |
| 2010/0141658 A1* | 6/2010 | Danton et al. | ................ | 345/441 |
| 2010/0269030 A1* | 10/2010 | Mr. Dugonjic | ................ | G06Q 30/02 715/207 |
| 2010/0295839 A1* | 11/2010 | Nagaya | ................ | G06F 1/3265 345/212 |
| 2011/0029393 A1* | 2/2011 | Apprendi | ................ | G06Q 30/0277 705/14.73 |
| 2011/0032268 A1 | 2/2011 | Takei | | |
| 2011/0059775 A1* | 3/2011 | Choi et al. | ................ | 455/566 |
| 2011/0080478 A1* | 4/2011 | Kohno | ................ | G06F 3/147 348/143 |
| 2011/0093723 A1* | 4/2011 | Brown et al. | ................ | 713/193 |
| 2011/0166937 A1* | 7/2011 | Bangera | ................ | G06Q 30/02 705/14.58 |
| 2011/0169823 A1 | 7/2011 | Barenburg et al. | | |
| 2011/0176720 A1 | 7/2011 | Van Osten et al. | | |
| 2011/0213664 A1 | 9/2011 | Osterhout et al. | | |
| 2012/0041825 A1* | 2/2012 | Kasargod | ................ | G06Q 30/02 705/14.68 |
| 2012/0130800 A1* | 5/2012 | Pradeep | ................ | G06Q 30/0242 705/14.41 |
| 2012/0135783 A1* | 5/2012 | Sams | ................ | G06T 15/60 455/556.1 |
| 2012/0206471 A1* | 8/2012 | Sarnoff | ................ | G06T 11/60 345/581 |
| 2012/0268391 A1* | 10/2012 | Somers | ................ | G06F 1/1694 345/173 |
| 2013/0016102 A1* | 1/2013 | Look | ................ | G06T 15/20 345/426 |
| 2013/0110617 A1* | 5/2013 | Phan | ................ | H04W 4/206 705/14.43 |
| 2013/0121569 A1* | 5/2013 | Yadav | ................ | G06T 5/50 382/164 |
| 2013/0155187 A1* | 6/2013 | Skyberg | ................ | H04N 5/23222 348/46 |
| 2013/0229406 A1* | 9/2013 | Elyada | ................ | G06Q 30/02 345/419 |

OTHER PUBLICATIONS iPad Game Review: CF Defense HD, JadeDragon, Jul. 26, 2010, pp. 1-4.*

Smoothing Sensor Data with a Low-Pass Filter, Nichols, Aug. 24, 2011.*

Yi-Jing, Li, "Study on Smoothing Browser in Multi-view Virtual Space Based on Panorama", In Proceedings of the International Archives of the Photogrammetry, Remote Sensing and Spatial Information Sciences,vol. XXXVII, Part B2, 2008, pp. 1081-1084.

"Interactive Advertising Bureau Mobile Rich-media Ad Interface Definitions (MRAID) v.1.0", Published on: Oct. 20, 2011, Available at: http://www.iab.net/media/file/IAB_MRAID_VersionOne_final.pdf.

"Uncover Your World" with AdMob Rich Media and the Google Search App, Published on: Aug. 26, 2011, Available at: http://googlemobileads.blogspot.com/2011/08/uncover-your-world-with-admob-rich.html.

Nasiri, et al., "Motion Processing: The Next Breakthrough Function in Handsets", In Proceedings of InvenSense Inc., Jul. 2009, 10 pages.

"Yahoo! Living Ads: Where Motion and Emotion Meet", Retrieved on: Dec. 13, 2011, Available at: http://advertising.yahoo.com/blogs/events-blog/yahoo-living-ads-where-motion-emotion-meet-024820497.html.

Wong, Dan, "The Emerging Trend: Smartphone Ad and In-App Ad", Retrieved on: Dec. 13, 2011, Available at: http://www.slideshare.net/Madhouse/the-emerging-trend-smartphone-ad-and-in-app-ad.

Elyada, et al., "Controlling Images at Hand-held Devices", New US Application filed Today.

* cited by examiner

CONTROLLING IMAGES AT MOBILE DEVICES USING SENSORS

BACKGROUND

Mobile computing devices such as mobile telephones, tablets, slates, personal digital assistants and others are widely available and increasingly used for many purposes. As computing resources are generally limited at such mobile computing devices these devices often make use of web-based services and computing infrastructure in the cloud.

For many applications images are to be presented at displays integral with the mobile device where those images are obtained from other entities in a communications network such as web servers and other entities. Control of the images at the mobile devices has involved static display of the images for various purposes such as advertising, provision of a user interface and other purposes. Often the available display area is limited as the devices are often hand-held and this limit on space has constrained the control of images at such mobile devices.

The embodiments described below are not limited to implementations which solve any or all of the disadvantages of known processes for controlling images at mobile devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Controlling images at mobile devices using sensors is described, for example, for interactive advertisements which respond to sensor readings at a mobile computing device. In various embodiments images are displayed at a mobile computing device according to sensor readings observed at the device and before user input is received at the images. For example, different regions of an image depicting a panorama are displayed as a mobile device is panned around or tilted. In another example images of an object in different orientations are presented as a mobile device is tilted in order to display the object as rotating. In various examples the images are displayed as part of a web page by using a template in the web page to control the display of images according to sensor readings. In various examples sensor readings are used to report user engagement with advertisements.

In various examples behaviors of images are defined by templates and knowledge of which template is used enables devices and systems to track sensor activity and identify specific use behavior patterns that are related to engaging with the images/visuals. For example, this may enable a device to tell with high confidence that a user is "playing" with a visual. In various examples in the field of advertising it is possible to measure user engagement with advertisements even before a user has touched a device display.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an advertising system, the systems described are provided as an example and not a limitation. As those skilled in the art will appreciate, the present examples are suitable for application in a variety of different types of systems for sensor-based control of images at hand-held computing devices.

Figure 1:
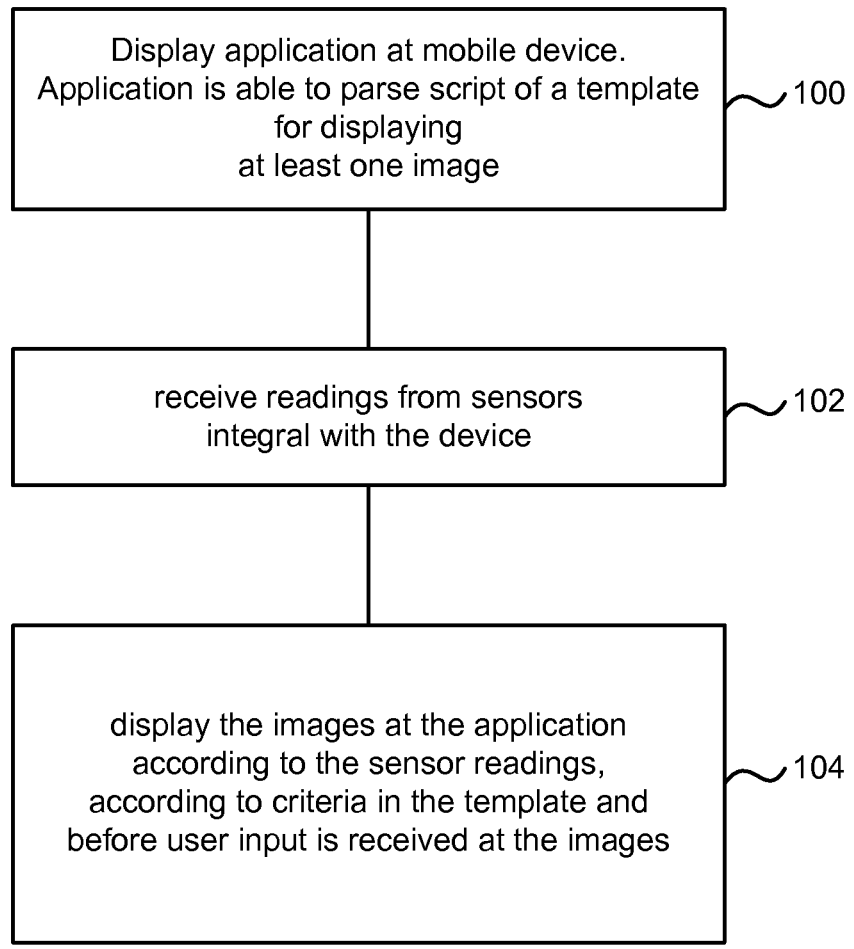
FIG. 1 is a flow diagram of a method of controlling images at a mobile computing device.

FIG. 1 is a flow diagram of a method of controlling images at a mobile computing device such as a mobile telephone, slate computer, tablet computer, personal digital assistant or other computing device which may be easily moved. The computing device has one or more integral sensors and a non-exhaustive list of examples is: accelerometer, compass, global positioning system, gyroscope, light sensor, magnetometer, camera, microphone, touch interface. The computing device may have a web browser of any suitable type for accessing and displaying web pages and content including images from the internet, an intranet or other communications network. In some examples the images may comprise video although that is not essential. The computing device may comprise a control that may run within any application to enable advertisements and or visuals to be displayed within that application according to script of templates.

The method comprises displaying 100 an application arranged to parse script of templates where a template is arranged to display at least one image as part of the application. A template comprises an identifier of each image to be displayed such as an address or link to a location from which the image may be accessed. A template also comprises one or more criteria (such as rules, thresholds or other criteria) as described in more detail below and instructions about how to display the image or images at the device according to the criteria.

Readings are received 102 from one or more sensors integral with the mobile computing device. The sensor readings may be smoothed and/or filtered to remove noise. The image or images are then displayed 104 at the application according to the sensor readings, according to criteria in the template and before user input is received at the image or images. User input is received at an image displayed at the hand-held computing device when a user touches the image (where a touch-sensitive interface is provided) and/or where a user clicks on or hovers a cursor on the image.

Figure 2:
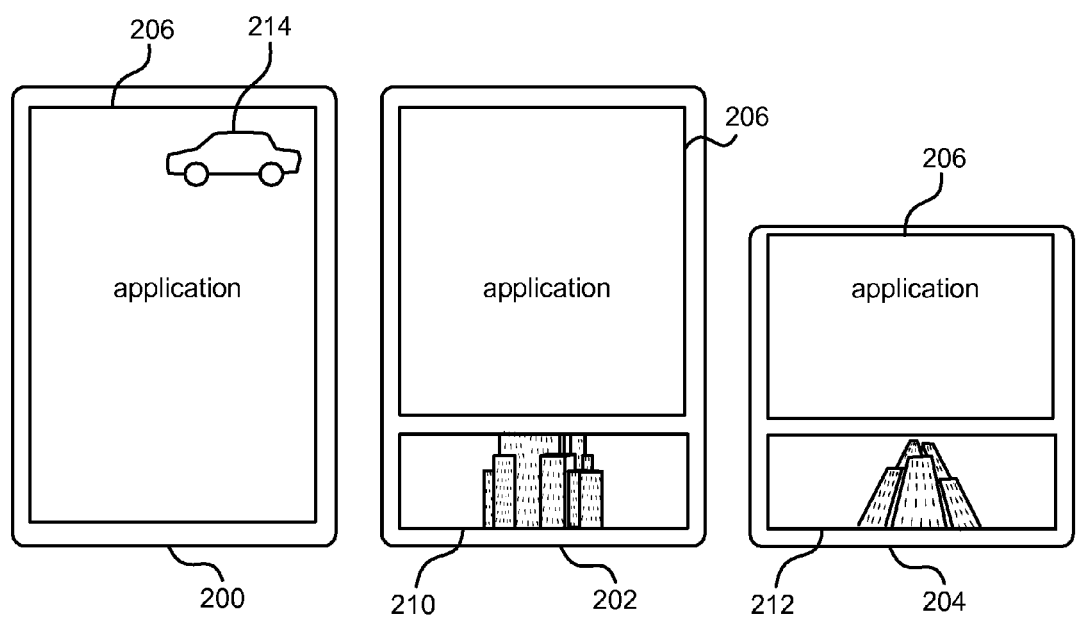
FIG. 2 shows two schematic plan views of a mobile computing device and a schematic view of the mobile device tilted away from a user.

FIG. 2 shows three views of a mobile telephone 200, 202, 204. The mobile telephone may display an application 206 such as a web-based application at a display screen. In an example an image of a car 214 is displayed as an advertisement within the application display and may be referred to as an "in-app ad". A plurality of images of the car 214 may be available depicting the car in different views and the sensors in the mobile phone used to control which image is displayed. In this way a user is able to change the orientation of the mobile phone (for example) in order to view images of the car in different orientations.

In another example a banner advertisement 210 is displayed comprising an image in a banner region of the display. An image of a skyscraper may be partly displayed in the banner region with different parts of the image being displayed according to an orientation of the mobile telephone. For example, the base of a skyscraper may be displayed in the banner advertisement 210 when the mobile telephone is fronto-parallel to the user and the top 212 of the skyscraper displayed when the mobile telephone is tilted away from the user. In this way a user is able to change the orientation of the mobile phone (for example) in order to reveal different parts of an image.

Figure 3:
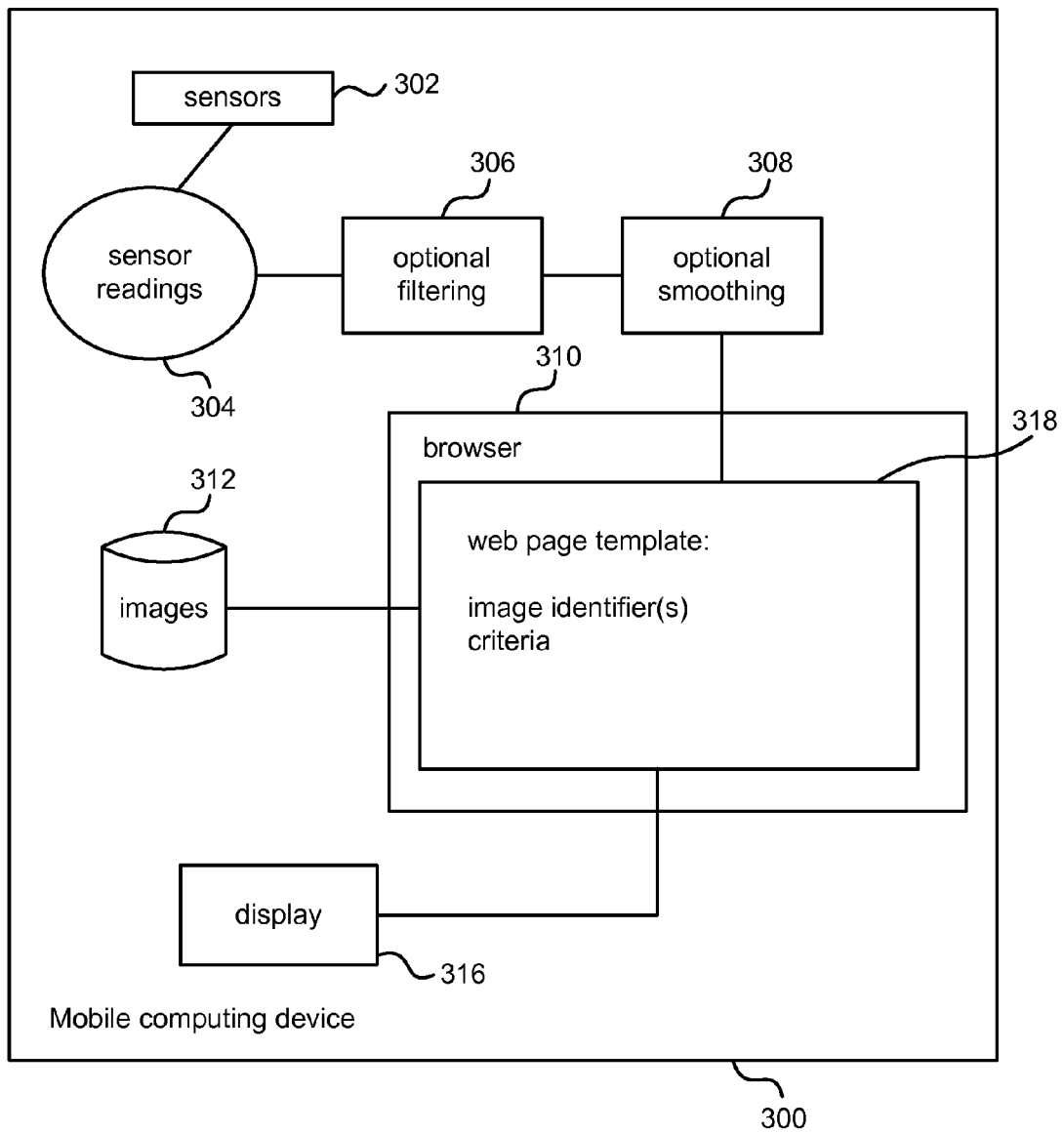
FIG. 3 is a schematic diagram of a mobile computing device.

FIG. 3 is a schematic diagram of a mobile computing device 300 showing functionality used in the examples described herein. Other components and parts of the mobile computing device are not shown to aid clarity but are available to enable operation of the device as a mobile computing device such as a mobile telephone, slate computer or similar.

The device comprises at least one sensor 302 which may be any combination of one or more of: an accelerometer, a compass, a global positioning system, a gyroscope, a microphone, a magnetometer, a camera, a touch screen. Sensor readings 304 are captured and optionally filtered 306 to remove noise. The Sensor readings 304 are optionally smoothed 308 to facilitate smooth control of images at the device. The filtering may be carried out using band pass filters or in other ways. The smoothing may be carried out using an averaging or other aggregation process or by fitting a smooth function to the sensor readings or in any other way. In FIG. 3 the filtering 306 and smoothing 308 operations are shown as being carried out separately of a browser 310. However, it is also possible for the browser 310 to carry out some or all of the filtering and smoothing.

The device comprises a web browser 310 arranged to enable web pages to be retrieved from the internet, an intranet or any computing entity over a communications network. The web browser enables web pages comprising content such as images (and in some examples video) to be retrieved (downloaded) and rendered on a display 316 integral with or in communication with the device. The web pages may comprise one or more templates 318. Each template comprises identifiers of one or more images (or video) to be displayed at the mobile device. The identifiers may be addresses of the images/video or links for downloading the images/video from another entity. Each template also comprises one or more criteria for controlling the downloaded images on the basis of the sensor readings 304. The downloaded images 312 may be stored at the mobile device although that is not essential.

Figure 4:
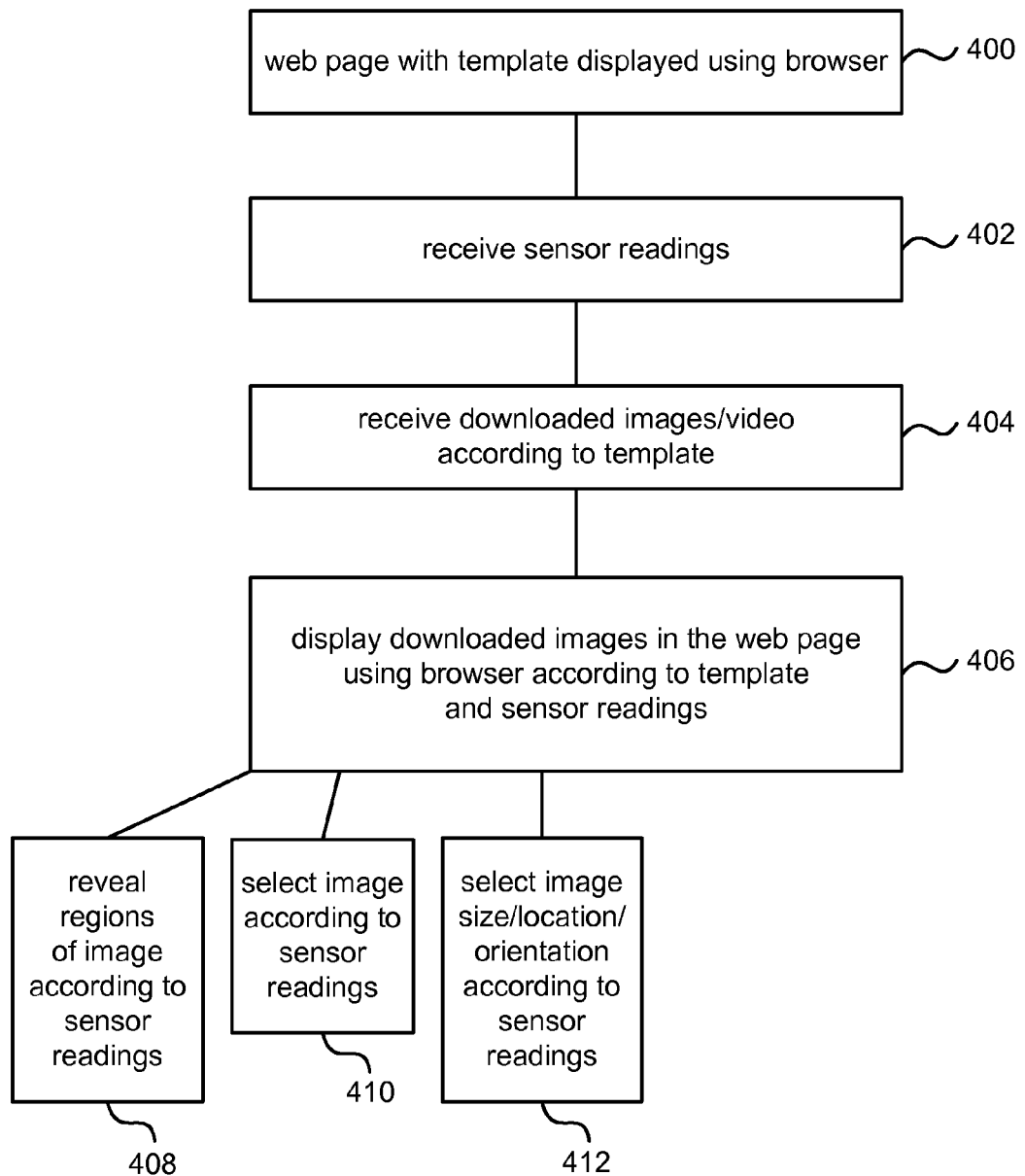
FIG. 4 is a flow diagram of methods of controlling images at a mobile computing device.

FIG. 4 is a flow diagram of methods of controlling images at a mobile computing device. A web page comprising a template is displayed 400 using a web browser at a mobile computing device. The template may be as described above with reference to FIG. 3. Sensor readings are received 402 at the browser and these readings are optionally filtered and optionally smoothed as described above. The browser may carry out the filtering and/or smoothing.

The template comprises identifiers of one or more images and these images are accessed, for example, by downloading them using the browser. Thus the downloaded images are received 404 according to the template. The downloaded images are displayed 406 as part of the web page using the browser and according to the template and the sensor readings.

In some examples different regions of an image are displayed 408 according to the sensor readings. For example, the image depicts a panorama and different regions of the panorama are revealed according to changes in sensor readings that indicate a change in orientation of the mobile computing device. For example, the template may specify that: the left most third of an image depicting a panorama (such as a cityscape) be presented when the sensor readings indicate that the mobile is facing the left; the central third of the image be presented when the sensor reading indicate that the mobile is facing forwards; and the right third of the image be presented when the sensor readings indicate that the mobile is facing the right. For example, sensor readings from one axis of an accelerometer may be used to indicate when the mobile is facing left, forwards or right (panning direction). In another example, the image depicts a vertical panorama (such as a perspective view of a single skyscraper from the ground upwards) and the template may specify that a bottom region, central region and top region of the image be presented according to sensor readings from another axis of an accelerometer (tilt direction). In another example, the image depicts a plan view of the sky (looking upwards from the ground) in a city with skyscrapers. Different regions of the image may be presented according to sensor readings from two axes of an accelerometer (pan and tilt).

In another example a region of an image is presented as if a spotlight were making that part of the image visible; the remaining parts of the image may be opaque. For example the image depicts a scene and different regions of the scene are revealed as if under a spotlight according to changes in sensor readings that indicate a change in orientation of the mobile device. The template may be arranged to cause the region of the image that is presented to vary according to the sensor readings. For example, the spotlight may be arranged to follow a pointing direction of a center of the mobile device as sensed by the sensor readings (for example, pan and tilt as detected by an accelerometer and/or gyroscope).

In some examples a plurality of images are available and the template specifies how to select 410 one of these images for display at the web page according to the sensor readings. For example, a plurality of images of a 3D object depicting the object in different orientations may be downloaded. The template may control selection of an image from the set of images to be presented according to the sensor readings. For example, a user may twist or rotate his or her mobile device to view images of a car in sequence as if the car were rotating. In this example the sensor readings may be from an accelerometer or gyroscope.

In some examples one or more images are available and the template specifies the image size, location and orientation according to sensor readings which indicate a change in orientation of the device. For example, the orientation of an image at the display may be changed according to the sensor readings to mimic the effect of gravity. This may be achieved by making the orientation of an image at the display change according to the sensor readings so that a specified axis of the image remains parallel to an axis of the accelerometer.

In another example one of the images depicts a cross-hair, dart, gun, pointing finger or other item to be aimed at a location in a second image depicting a scene. The images are displayed superimposed on one another and the location, size and orientation of the item to be aimed is controlled by the template according to the sensor readings. For example, accelerometer readings or gyroscope readings indicating the pan and tilt of the device. In an example the template is used to display at least part of a second image as a layer over a first image, and to display relative motion between the first and second images according to the sensor readings such that in use, a user is able to aim an element depicted in the second image onto part of a scene depicted in the first image.

In another example one or more images are available each depicting a particle where a particle may be any minute portion of matter such as a grain of sand, rain drop, snow drop, insect, smoke particle and others. The template may specify how to display the images according to the sensor readings in order to mimic behavior of particle systems or flow systems. For example, making swarms of dots, bees or fireflies move according to the sensor readings, making balls bounce and roll according to the sensor readings, making sand and confetti move according to the sensor readings. In other examples the images are controlled to simulate flow of gases, liquids and vapors such as water, gel, gas, smoke or fire. In some examples the template is arranged to render the image such that it depicts a texture which flows according to the sensor readings.

In some examples depth effects are achieved by superimposing two or more images and displacing the images relative to one another according to sensor readings which indicate a change in orientation (such as pan and/or tilt) of the device. For example, an image of text may be superimposed on a landscape. An image of a shadow of the text may be layered between the text image and the landscape image. Displacing the images relative to one another according to the pan and/or tilt of the mobile device enables a view to experience an illusion of the text popping out of the screen, or being in the plane of the screen or being deep inside the device. Using a shadow of the text which moves with the text increases the illusion. In an example the template is used to display at least part of a second image as a layer over a first image and to display relative motion between the first and second images according to the sensor readings. Then in use the second image may appear at a different depth with respect to the first image.

In some examples depth effects are achieved by using 3D graphics rendering. A 3D model of an object may be rendered at the mobile computing device according to sensor readings which indicate an orientation of the device. For example, the sensor readings are sent to a web service which returns an image to be displayed at the device. The image may have been formed from a 3D model of the object using ray tracing or other techniques with the view point (camera position) being the orientation of the mobile device as specified by the sensor readings. For example, the template may be used to render the image from a 3D object model and using the sensor readings to change a camera viewpoint of the rendered image. In other examples the 3D rendering takes place at the mobile device itself.

In some examples the sensor comprises a global positioning system (GPS) which provides an indication of the geographical location of the mobile device (such as a longitude and latitude or other co-ordinate). The template may be arranged to control orientation 412 of an image at the mobile device so that it points or indicates a direction according to the GPS output and one or more other criteria. The other criteria could be the location of a store or the location of an entity specified by the user. In an example, the sensor readings comprise a geographical location of the mobile computing device and the template is arranged to display an image at the web page which comprises an indicator of a direction related to the geographical location of the device and a second specified geographical location.

In some examples the sensor comprises a touch sensor such as a touch screen which provides an indication of the location on a display screen of a user's finger or other object touching the screen. The template may be arranged to control opacity of different regions of an image on the basis of the touch sensor readings. For example, a region of an image may be opaque and when a user scratches that region the touch sensor readings may be used to trigger a change in opacity of the part of the image which has been scratched. For example to reveal detail such as a message or number as on a scratchable lottery card.

In some examples the sensor comprises a microphone which detects an amount of ambient noise in the environment. The template may be arranged to control an image or a sequence of images according to the microphone readings. For example, to display animation of an avatar which appears angry when the environment is noisy and calm when the environment is quiet.

In some examples the sensor comprises a light sensor which detects an amount of ambient light in the environment. The template may be arranged to control one or more images according to the light sensor readings. For example, by controlling intensity levels of an image to display an image depicting an object where the amount the object is lit in the image is varied according to the light sensor readings.

In the examples described it is possible for the template to change the image(s) in response to sensor readings before a user touches the device display. For example, in the field of advertising it is possible to measure patterns of sensor data and identify at what point a user is actually engaging with advertisements. For example, in the panorama case it is possible to look for specific patterns that show a user was exposed to an entire panorama view one or more times. This measurement may be used for charging for advertisement engagement. For example the device may count the number of times that assets of a template are displayed and use that as a measure of engagement. An asset of a template may be any of the images, videos or other content to be displayed by the template.

In examples the images may be used to provide an advertisement at the mobile device. Details of an architecture for controlling images to provide advertisements at mobile devices and for tracking user engagement with the advertisements are now given with reference to FIG. 5.

Figure 5:
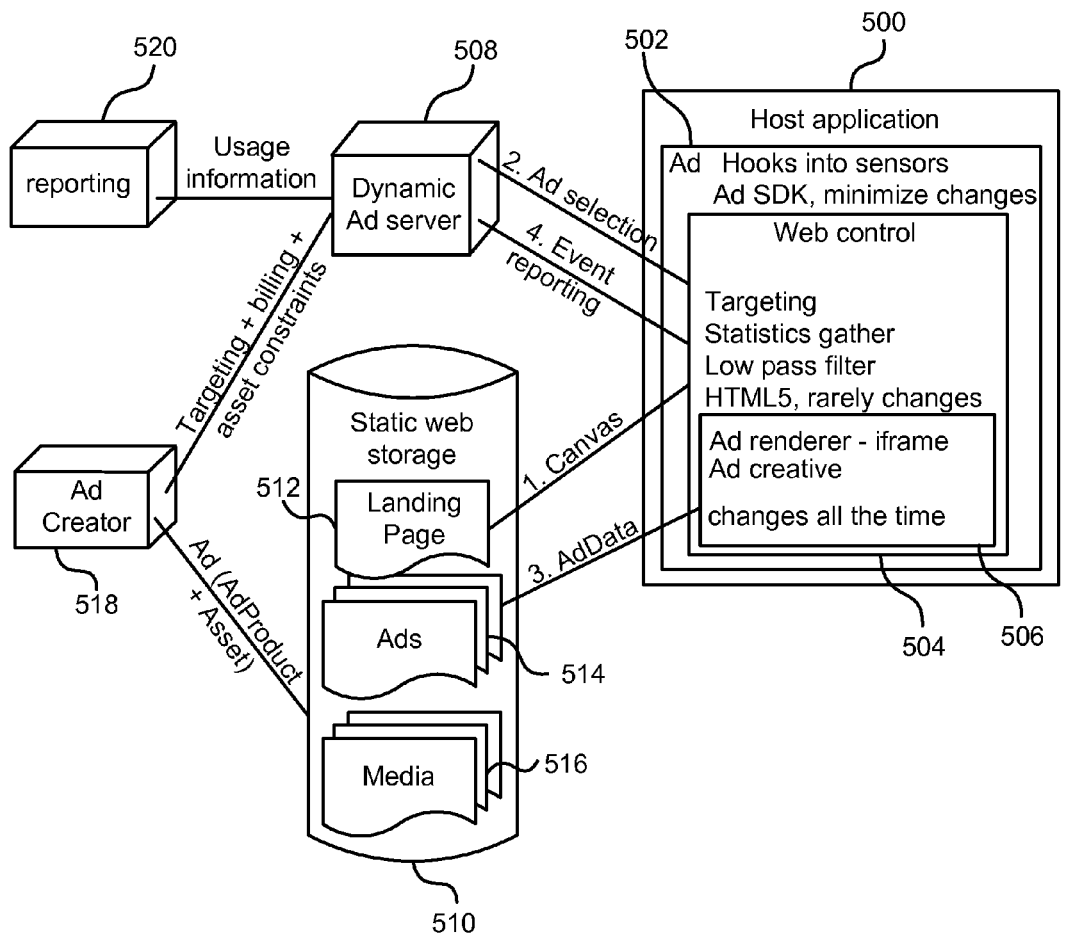
FIG. 5 is a schematic diagram of entities in a system for controlling images at a mobile computing device.

FIG. 5 shows a web server for static web storage 510 holding a landing page 512, a plurality of advertisements 514 and a plurality of media items 516 such as images, videos, audio tracks, documents, text or other content. The web server 510 is provided in a communications network together with a dynamic ad server 508, a reporting node 520 and an ad creator node 518 all of which are computer-implemented. The ad creator node 518 may be a web service provided at a node in the communications network which enables advertisers or other entities to create advertisements and store these at the static web storage 510. Targeting, billing and asset constraints may be associated with an advertisement at the ad creator node 518 and sent to the dynamic ad server 508.

The dynamic ad server 508 is arranged to store information about advertising events such as information about when advertisements are presented and sensor data associated with advertisements. This is described in more detail below. The dynamic ad server 508 is arranged to analyze the event information and sensor data to calculate usage statistics and other information to be used by the reporting node 520. The reporting node 520 is arranged to generate reports about advertisement events and sensor data associated with advertisements.

A plurality of mobile computing devices in the communications network are able to receive advertisements from the static web storage 510. In FIG. 5 only one mobile computing device is represented for clarity.

A host application 500 is present at a mobile device such as a mobile telephone, slate computer or other mobile computing device. The host application may be any web browser which is able to enable the mobile computing device to download and present web pages. The host application comprises at least one advertisement 502 which may be arranged to receive or retrieve sensor readings from sensors at the mobile device. For example, an ORMMA 2 compatible API may be used to obtain the sensor readings. However, this is not essential. Any method of receiving or retrieving the sensor readings may be used.

The advertisement comprises a web control component 504 which may be arranged to interact with the dynamic ad server to determine which advertisement to present. For example, the web control component 504 may communicate with a dynamic ad server 508 which provides an indication of which advertisement to present according to targeting criteria, billing and asset constraints known to the dynamic ad server. The web control component 504 may gather statistics about which advertisements are presented. The web control component 504 may comprise a low pass filter for applying to the sensor readings to remove noise. The web control component reports events to the dynamic ad server 508 such as when an advertisement is presented, when an advertisement is actively selected by a user making a touch selection or cursor selection, when a advertisement is engaged as indicated by sensor readings and other events.

The web control component 504 is arranged to display the landing page 512 at the mobile device and the landing page comprises an image presentation element 506 such as an iframe or other container or element for inserting an image or video on a web page. The image presentation element such as the iframe comprises the template described above and is arranged to receive the sensor readings. The image presentation element is able to process the sensor readings in relation to the criteria in the template and control presentation of images at the image presentation element accordingly. It receives images and other content for presentation from the static web storage 510.

The architecture described with respect to FIG. 5 is only one possible example and many alternatives are possible.

Figure 6:
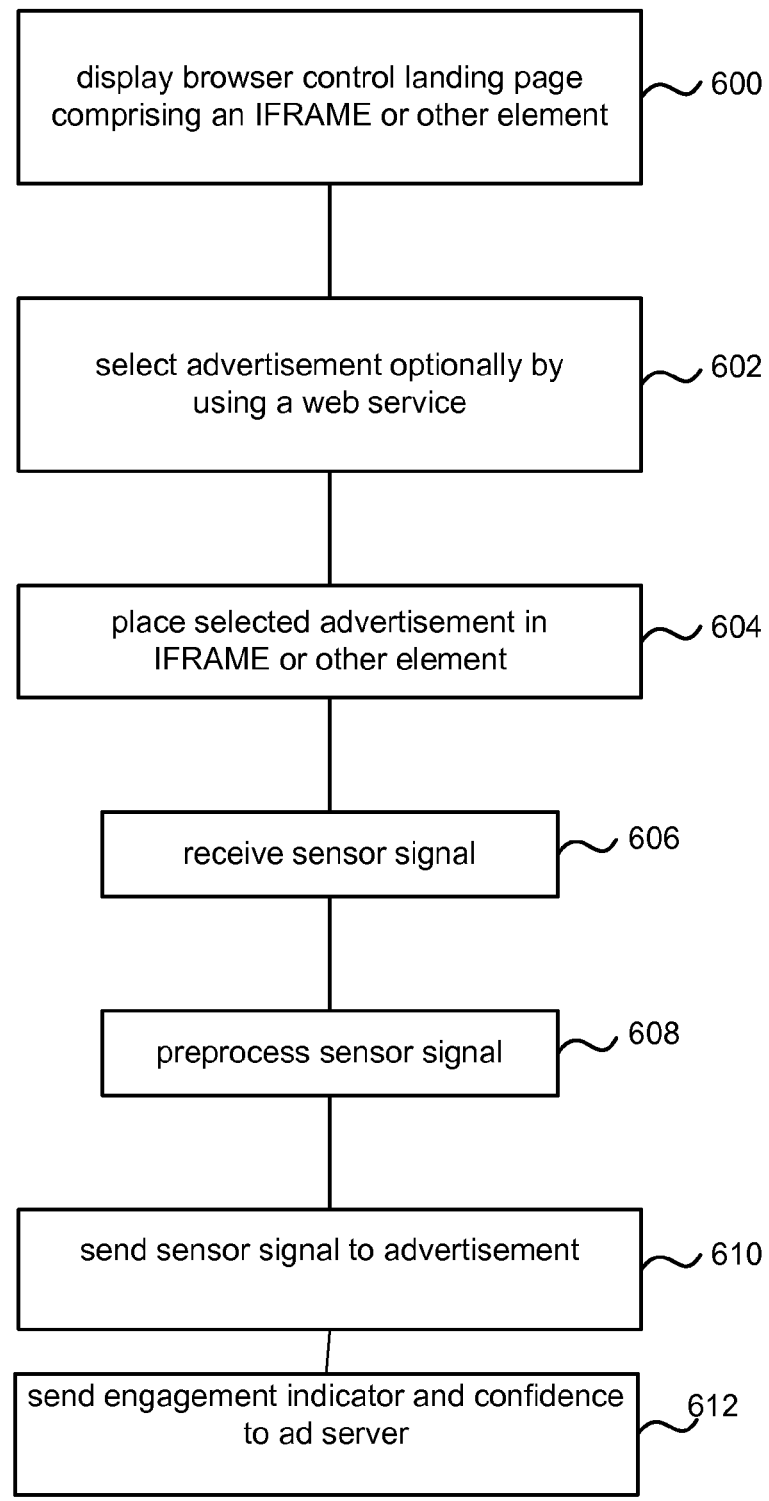
FIG. 6 is a flow diagram of a method at a mobile computing device.

FIG. 6 is an example of a method at a browser of a mobile computing device. The browser displays 600 a browser control landing page comprising an iframe or other element for displaying an image, video or other content at the browser control landing page. The browser selects 602 an advertisement to be presented by communicating with a web service for that purpose or in any other way. The browser places 604 the selected advertisement in the iframe or other element to display the advertisement. The browser receives 606 sensor signal from the mobile computing device and optionally pre-processes 608 the sensor signals. The browser sends 610 the sensor signals to the iframe or other element. The engagement indicators and confidences may be calculated at the mobile device according to instructions in the templates and may be sent 612 to the dynamic ad server.

Figure 7:
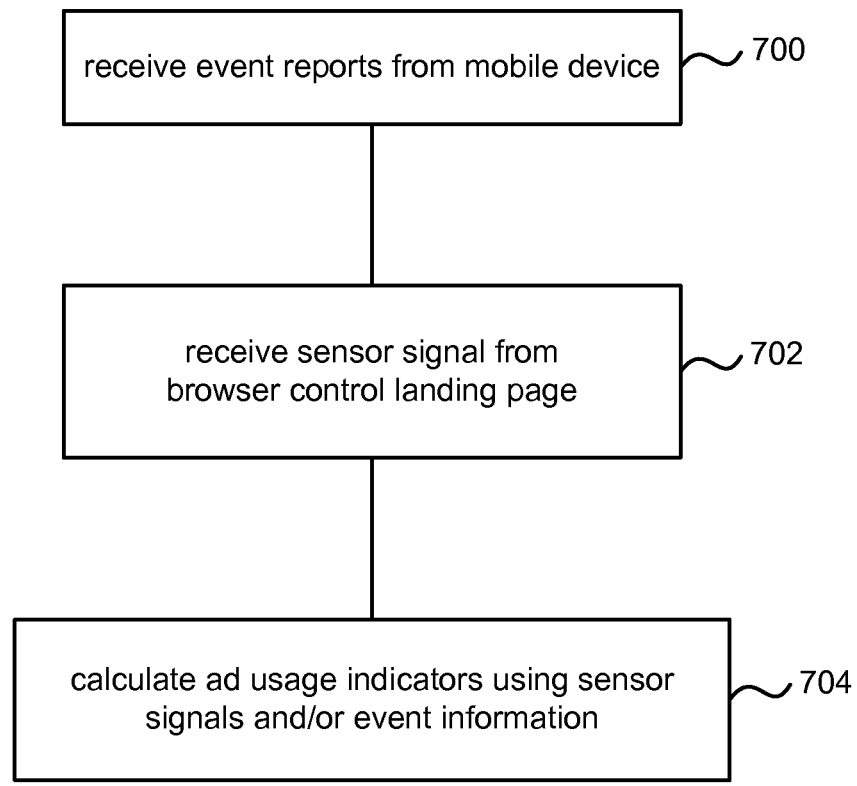
FIG. 7 is a flow diagram of a method at an entity for monitoring user engagement with an advertisement.

FIG. 7 is an example of a method at a dynamic ad server such as that of FIG. 5. The server receives 700 event reports from mobile computing devices describing advertising events such as times at which advertisement impressions are made and features describing the impressions. The server also receives 702 engagement indicators and associated confidences from the mobile computing devices. An engagement indicator is a measure of a degree of interaction of a user with an advertisement or visual. A confidence of an engagement indicator is a measure of how accurate the engagement indicator is. The engagement indicators and confidences may be sent from a browser control landing page at a mobile computing device to the dynamic ad server. The dynamic ad server is able to engagement indicators, confidences and event reports which are from the same mobile computing device (for example, using identifiers of the mobile computing device where a user of the device has given consent). Timestamps may be associated with the engagement indicators and event reports so that the dynamic ad server is able to determine which sensor readings were observed during a specified event.

The engagement indicators and confidences may be calculated at the mobile device according to instructions in the templates.

The dynamic ad server is arranged to calculate 704 ad usage indicators using the engagement indicators, confidences and/or event information. This involves determining if the engagement indicators behave as if the ad has been engaged by the user of the mobile computing device. This step may take place at the mobile device. Recognizing genuine ad engagement by a user as opposed to random engagement indicators may be done by comparing the engagement indicators with those observed for a non-interactive ad. The sensor readings for a non-interactive ad may be observed dynamically from the mobile computing device. This enables individual differences in user behavior to be taken into account and changes in sensor behavior as the user moves into different environments (office, car, outside, home) to be taken into account. In other examples sensor reading for non-interactive ads are observed empirically and statistics describing the sensor readings configured at the dynamic ad server during an offline process. Thus sensor readings may be used as measures of engagement of a user with an advertisement.

The ad usage indicators may be used to select ads for future presentation by advertiser or by ad network. The ad usage indicators may also be used for billing purposes. For example, different payment levels may be defined for different levels of user interaction with an advertisement as specified by the ad usage indicators.

Figure 8:
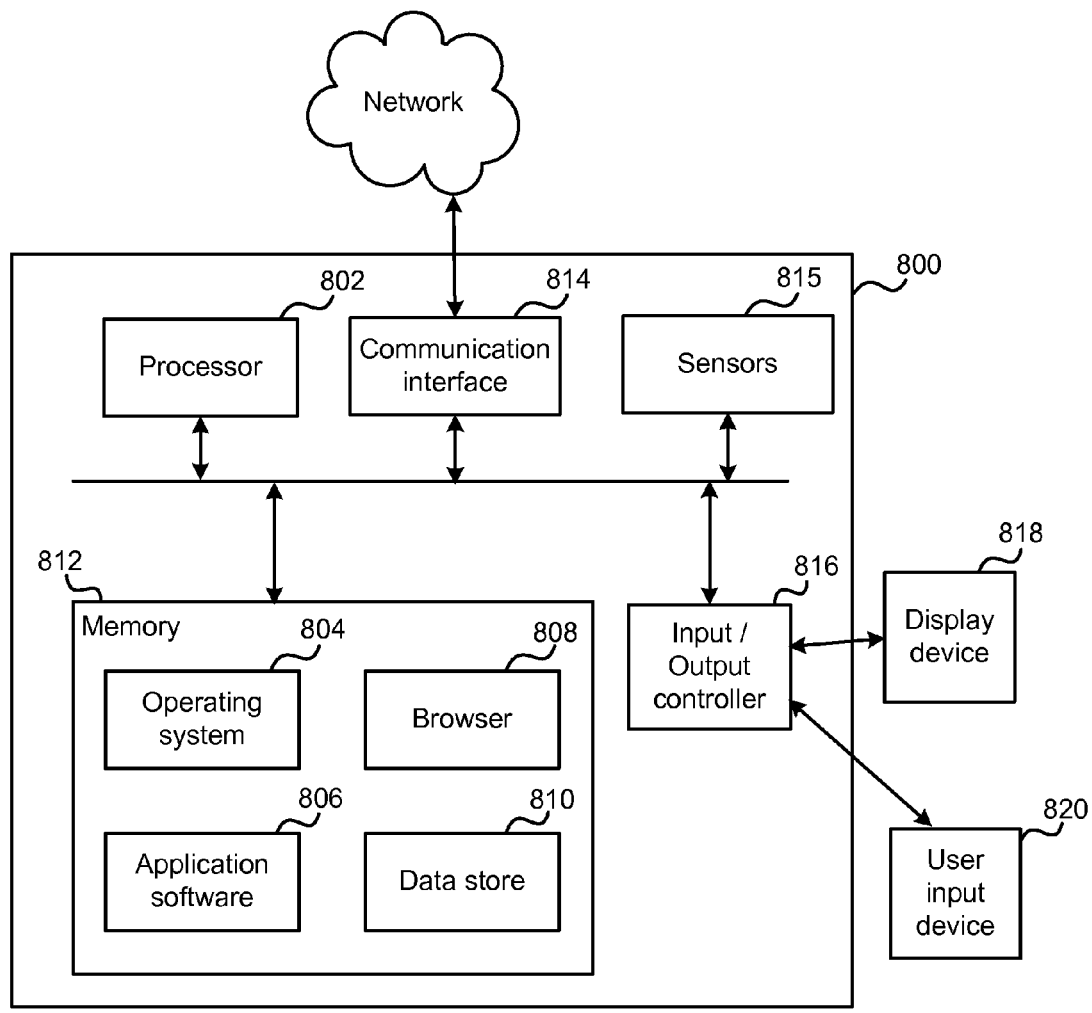
FIG. 8 illustrates an exemplary computing-based device in which embodiments of a mobile computing device may be implemented.

FIG. 8 illustrates various components of an exemplary computing-based device 800 which may be implemented as any form of a computing and/or electronic device, and in which embodiments of a mobile computing device may be implemented.

Computing-based device 800 comprises one or more processors 802 which may be microprocessors, controllers or any other suitable type of processors for processing computer executable instructions to control the operation of the device in order to implement a mobile computing device which is able to control images using sensors. In some examples, for example where a system on a chip architecture is used, the processors 802 may include one or more fixed function blocks (also referred to as accelerators) which implement a part of the method of controlling images using sensors in hardware (rather than software or firmware). Platform software comprising an operating system 804 or any other suitable platform software may be provided at the computing-based device to enable application software 806 to be executed on the device. Browser 808 software is provided at the computing-based device to enable web pages to be downloaded and displayed at the device using display device 818. A data store 810 is available to enable content such as images, videos and other media to be stored for presentation on web pages in the browser 808 and for storing criteria, rules, sensor readings and other data.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage may be distributed or located remotely and accessed via a network or other communication link (e.g. using communication interface 814).

The computing-based device 800 comprises one or more sensors 815 and a non-exhaustive list of examples is: accelerometer, compass, global positioning system, gyroscope, light sensor, magnetometer, camera, microphone, touch interface.

The computing-based device 800 also comprises an input/output controller 816 arranged to output display information to a display device 818 which may be separate from or integral to the computing-based device 800. The display information may provide a graphical user interface and/or audio output or other types of display output. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface. This user input may be used to browse web pages, interact with advertisements displayed at the display device 818 or for other purposes. In an embodiment the display device 818 may also act as the user input device 820 if it is a touch sensitive display device. The input/output controller 816 may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, slate computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling at least two images at a mobile computing device comprising:
   displaying a web page and a first image at the mobile computing device, the web page having a template for displaying at least the first image, the first image being one of a set of images of a first advertisement;
   receiving readings from sensors integral with the device;
   calculating a first engagement indicator of the first advertisement before user input is received at the displayed first image, the first engagement indicator being calculated based at least in part on the sensor readings;
   calculating a first confidence score of the first engagement indicator before user input is received at the displayed first image;
   displaying a second image at the web page according to the sensor readings, according to criteria in the template and before user input is received at the displayed first image, the second image being one of the set of images of the first advertisement, the first advertisement being an interactive advertisement; and
   determining if the first advertisement has been engaged by a user, the determination based at least in part on the first confidence score of the first engagement indicator, and a comparison of the first engagement indicator to a second engagement indicator, the first engagement indicator being calculated based at least in part on the sensor readings, the second engagement indicator being calculated based at least in part on sensor readings observed for the second image.

2. A method as claimed in claim 1 comprising displaying the second image at the web page by revealing different regions of the image according to changes in the sensor readings.

3. A method as claimed in claim 2 wherein the second image depicts a panorama and different regions of the panorama are revealed according to changes in sensor readings that indicate a change in orientation of the mobile computing device.

4. A method as claimed in claim 2 wherein the second image depicts a scene and different regions of the scene are revealed as if under a spotlight according to changes in sensor readings that indicate a change in orientation of the mobile computing device.

5. A method as claimed in claim 1 comprising using the criteria in the template to select one of a plurality of images to display at the web page according to the sensor readings, wherein each of the plurality of images depicts the same object in a different orientation.

6. A method as claimed in claim 5 wherein the criteria in the template specify that the images are selected for display according to sensor readings that indicate a change in orientation of the mobile device such that in use, the user is able to view different orientations of the object by changing the orientation of the device.

7. A method as claimed in claim 1 comprising using the template to display at least part of the second image as a layer over the first image, and displaying relative motion between the first and second images according to the sensor readings such that in use, the second image appears at a different depth with respect to the first image.

8. A method as claimed in claim 1 comprising using the template to render the first image from a 3D object model and using the sensor readings to change a camera viewpoint of the rendered image.

9. A method as claimed in claim 1 comprising using the template to rotate all or part of the second image on the basis of the sensor readings which indicate a change in orientation of the device.

10. A method as claimed in claim 1 comprising using the template to display at least part of the second image as a layer over the first image, and displaying relative motion between the first and second images according to the sensor readings such that in use, the user is able to aim an element depicted in the second image onto part of a scene depicted in the first image.

11. A method as claimed in claim 1 comprising using the template to display a plurality of images each depicting a particle and using the template to control a displayed motion of each particle according to the sensor readings.

12. A method as claimed in claim 1 comprising using the template to render the first image such that it depicts a texture which flows according to the sensor readings.

13. A method as claimed in claim 1 wherein calculating the first engagement indicator comprises calculating a number of times that assets of the template are displayed, assets of the template being images for display by the template.

14. A method as claimed in claim 1 wherein the sensor readings comprise a geographical location of the mobile computing device and displaying the second image at the web page comprises displaying an indicator of a direction.

15. A method as claimed in claim 1 wherein the sensor readings comprise light sensor readings and displaying the second image at the web page comprises using the template to adjust intensity levels in the second image such that in use, an object depicted in the second image is lit by different amounts according to the ambient light indicated by the light sensor readings.

16. A method as claimed in claim 1 wherein the sensor readings comprise touch screen input and displaying the second image at the web page comprises using the template to change the opacity of regions in the second image according to the touch screen input such that in use, the user is able to scratch an opaque image to reveal detail as if scratching a lottery card.

17. A method as claimed in claim 1 wherein the sensor readings comprise microphone readings and displaying the second image at the web page comprises using the template to change animation of an avatar.

18. A method of controlling at least one image at a mobile computing device comprising:
displaying a web page and a first advertisement at the mobile computing device, the web page having a template for displaying the first advertisement comprising the image, the first advertisement being an interactive advertisement;
receiving readings from sensors integral with the device;
measuring patterns associated with readings received from the sensors;
displaying the first advertisement at the web page according to the sensor readings, according to criteria in the template and before user input is received at the displayed image;
calculating a first engagement indicator associated with the first advertisement and a confidence level associated with the first engagement indicator before user input is received at the image, the first engagement indicator being based on the measured patterns;
sending data related to the first advertisement to another entity, the data comprising at least the calculated first engagement indicator and the associated confidence level and a time stamp;
displaying a second advertisement at the web page according to the sensor readings, according to criteria in the template and before user input is received at the displayed image; and
determining if the first advertisement has been engaged by a user, the determination based at least in part on the confidence level of the first engagement indicator, and on a comparison of the first engagement indicator to at least one second engagement indicator, the at least one second engagement indicator being observed for the second advertisement.

19. A method as claimed in claim 18 comprising filtering and smoothing the sensor readings before using them to control display of the first advertisement.

20. A mobile computing device comprising:
a processor having a web browser arranged to display a web page at the mobile computing device, the web page having at least a first and second templates for displaying at least one advertisement, each advertisement having at least a first image and a second image, the first template comprising at least a first criteria and the second template having at least a second criteria that is different from the first criteria, at least one of the first or second criteria being related to a location of the mobile computing device;
at least one sensor integral with the mobile computing device; and
a display screen,
the processor being arranged to display the first image of a first advertisement at the web page on the display screen according to readings from the at least one sensor, according to at least the first or second criteria in at least the first or second template and before user input is received at the first advertisement,
the processor being further arranged to calculate a first engagement indicator of the first advertisement before user input is received at the first image, the first engagement indicator being calculated based at least in part on the readings from the at least one sensor, and calculate a first confidence score of the first engagement indicator before user input is received at the first image,
the processor being further arranged to display the second image at the web page according to the sensor readings, according to the second criteria in the template, and before user input is received at the first image, and
the processor being further arranged to determine if the first advertisement has been engaged by a user, the determination based at least in part on a comparison of the first engagement indicator to a second engagement indicator, the first engagement indicator calculated based at least in part on the readings from the at least one sensor and the second engagement indicator being calculated based at least in part on sensor readings observed for the second image.

* * * * *